United States Patent
Park et al.

(10) Patent No.: US 6,859,933 B2
(45) Date of Patent: Feb. 22, 2005

(54) DYNAMIC VIBRATION ABSORBER FOR A DISK PLAYER

(75) Inventors: Jun-min Park, Seoul (KR); Young-won Lee, Suwon (KR); Young-sun Seo, Sungnam (KR)

(73) Assignee: Samsung Electronics, Co., Ltd., Suwon-si (KR)

( * ) Notice: Subject to any disclaimer, the term of this patent is extended or adjusted under 35 U.S.C. 154(b) by 183 days.

(21) Appl. No.: 09/982,168

(22) Filed: Oct. 19, 2001

(65) Prior Publication Data

US 2002/0085478 A1 Jul. 4, 2002

(30) Foreign Application Priority Data

Nov. 15, 2000  (KR) ........................................ 2000-67766

(51) Int. Cl.[7] ............................................. G11B 33/08
(52) U.S. Cl. ........................................ 720/651; 720/692
(58) Field of Search ................................ 369/247, 248, 369/258, 263, 75.1, 77.1; 248/562; 720/651, 688, 689, 692, 693, 694, 698

(56) References Cited

U.S. PATENT DOCUMENTS

| | | | |
|---|---|---|---|
| 4,703,470 A | | 10/1987 | Castagna et al. |
| 5,180,147 A | | 1/1993 | Andersson et al. |
| 5,740,011 A | | 4/1998 | Kobayashi et al. |
| 5,768,249 A | * | 6/1998 | Ro et al. ................ 369/263 |
| 6,125,097 A | * | 9/2000 | Wu ........................ 369/263 |
| 6,178,156 B1 | * | 1/2001 | Kuwajima et al. .......... 369/263 |
| 6,426,935 B1 | * | 7/2002 | Imai et al. ................ 369/263 |
| 6,459,674 B1 | * | 10/2002 | Matsumoto et al. ........ 369/263 |

FOREIGN PATENT DOCUMENTS

| | | |
|---|---|---|
| CN | 1150694 | 5/1997 |
| CN | 2342438 | 10/1999 |
| EP | 0 884 731 | 12/1998 |
| JP | 60-182086 | 9/1985 |
| JP | 1-235042 | * 9/1989 |
| JP | 06-129488 | 5/1994 |
| JP | 11-3582 | 1/1999 |
| JP | 2000-90654 | 3/2000 |
| TW | 504669 | 10/2002 |

OTHER PUBLICATIONS

Translation of Chinese Patent 2342438Y, "High Rotation CD Crive with Vibration Arrestment", Oct. 1999.*
Abstract of Japanese Patent Application No. 59036033, filed Feb. 29, 1984.
Abstract of Japanese Patent Application No. 4304915, filed Oct. 17, 1992.
Abstract of Japanese Patent Application No. 9153302, filed Jun. 11, 1997.

* cited by examiner

*Primary Examiner*—David L. Ometz
(74) *Attorney, Agent, or Firm*—Staas & Halsey LLP (57) ABSTRACT

A dynamic vibration absorber for a disk player includes a deck base, a deck plate movably disposed on the deck base to support a spindle motor that spins a disk, a mass body disposed around the deck plate, and a flexibly changeable connection member that connects the deck plate and the mass body. A dynamic vibration absorber including the mass and connection member reduces vibration generated when the disk spins using a reciprocal action of the mass body and the connection member relative to the deck plate.

38 Claims, 9 Drawing Sheets

DYNAMIC VIBRATION ABSORBER FOR A DISK PLAYER

CROSS-REFERENCE TO RELATED APPLICATIONS

This application claims the benefit of Korean Application No. 2000-67766, filed Nov. 15, 2000, in the Korean Industrial Property Office, the disclosure of which is incorporated herein by reference.

BACKGROUND OF THE INVENTION

1. Field of the Invention

The present invention relates to a dynamic vibration absorber for a disk player, and more particularly, to a dynamic vibration absorber for a disk player that reduces vibration generated when a recording medium spins.

2. Description of the Related Art

Generally, a disk player is an apparatus that records and/or reproduces information to and from a disk such as a compact disk (CD), a CD-Rom, a digital video disk (DVD), a DVD-Rom, a CD-RW, and a combo disk. This apparatus needs to protect the disk and an optical pickup therein from both outer shock and inner vibration.

A conventional disk player generally includes a deck base disposed in a housing of the disk player, a deck plate movably disposed on the deck base, a spindle motor disposed on the deck plate to generate energy to spin the disk, a turn-table connected to a pivot shaft of the spindle motor to support the disk, a damper disposed at the upper part of the housing corresponding to the turn-table to clamp the disk on the turn-table, and an optical pickup movably connected to the deck plate to move radially across the disk to record and/or reproduce information to and from the disk. In the above construction, a buffering member is disposed between the deck base and the deck plate to protect the disk and the optical pickup from an outer shock.

However, since the centers of rotation and gravity of a conventional disk do not always correspond due to manufacturing errors, an inner vibration results and generates whirling. Because of the inner vibration, it is difficult to prevent the generation of idle revolution of a rotating shaft of the spindle motor.

Due to this problem, an auto-ball-balancer has been developed to balance an eccentric mass by setting up balls at opposite side of the mass eccentricity. The auto-ball-balancer includes a circular accommodating portion in a spinning body like the turn-table and the spindle motor, and the auto-ball-balancer is realized by placing balls having a predetermined mass in the accommodating portion. However, the auto-ball-balancer is only effective in balancing an eccentric disk. In addition, when the auto-ball-balancer is applied to the eccentric disk, the auto-ball-balancer also causes a problem by increasing the vibration in a resonance band.

In addition, although a deck plate is well balanced, it possesses a natural frequency in accordance with its design and material. Thus, when vibration is generated around the natural frequency, there is a problem of an increased vibration due to a resonance effect. In this case, it is difficult for the optical pickup to record and/or reproduce data to and from the disk. Due to this problem, there is a limitation in the increase in recording density of the disk. Moreover, the vibration can dramatically affect peripheral devices such as a hard disk drive (HDD) and a floppy disk drive (FDD).

SUMMARY OF THE INVENTION

It is an object of the present invention to provide a dynamic vibration absorber for a disk player to effectively reduce a vibration generated when a disk spins.

Additional objects and advantages of the invention will be set forth in part in the description which follows and, in part, will be obvious from the description, or may be learned by practice of the invention.

To accomplish the above and other objects, an embodiment of the present invention has a deck base, a deck plate movably disposed on the deck base to support a spindle motor that spins a disk, a mass body disposed around the deck plate, a flexibly changeable connection member that connects the deck plate and the mass body, where a reciprocal action of the mass body and the connection member reduces vibration generated when the disk spins.

According to an aspect of the present invention, the mass body is disposed on the deck plate at an outermost point from a geometrical center of a predetermined figure formed by supporting points of the deck plate at which the deck plate is supported by the deck base.

According to another aspect of the present invention, the mass body is disposed at a predetermined place of the deck plate that has a biggest vibration shift from the geometrical center.

According to a further aspect of the present invention, the connection member includes a body that is flexibly changeable by an outer force and has a space to allow for compression, a first flange portion extending in one direction from the body to support the mass body, and a second flange portion extending from another part of the body to accept the deck plate so as to be supported by the deck plate.

According to a yet further aspect of the present invention, the deck plate has a connection hole through which the second flange portion passes to be supported by the deck plate.

According to a still further aspect of the present invention, the mass body is a metallic ring having a connection hole through which the first flange portion passes to be inserted between the first flange portion and the body.

According to a yet still further aspect of the present invention, the mass body is a metallic plate having a connection opening cut from one end to be inserted between the first flange and the body.

According to yet another aspect of the present invention, the mass body is disposed above or below the deck plate to reduce vibration in the upper and the lower direction of the deck plate.

According to still another aspect of the present invention, the mass body is disposed to one side of the deck plate to reduce vibration in the one side of the deck plate.

According to yet still another aspect of the present invention, additional mass bodies and connection members are attached to the deck plate.

According to an additional aspect of the present invention, a viscoelastic member is disposed at the supporting points of the deck plate to reduce outer shock.

According to a yet additional aspect of the present invention, the mass body and the connection member comprise a combined member formed by injection molding.

BRIEF DESCRIPTION OF THE DRAWINGS

The above-mentioned and other objects, advantages, and features of the present invention will be more apparent and more readily appreciated by describing the preferred embodiments of the present invention referring to the accompanying drawings, in which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 1:
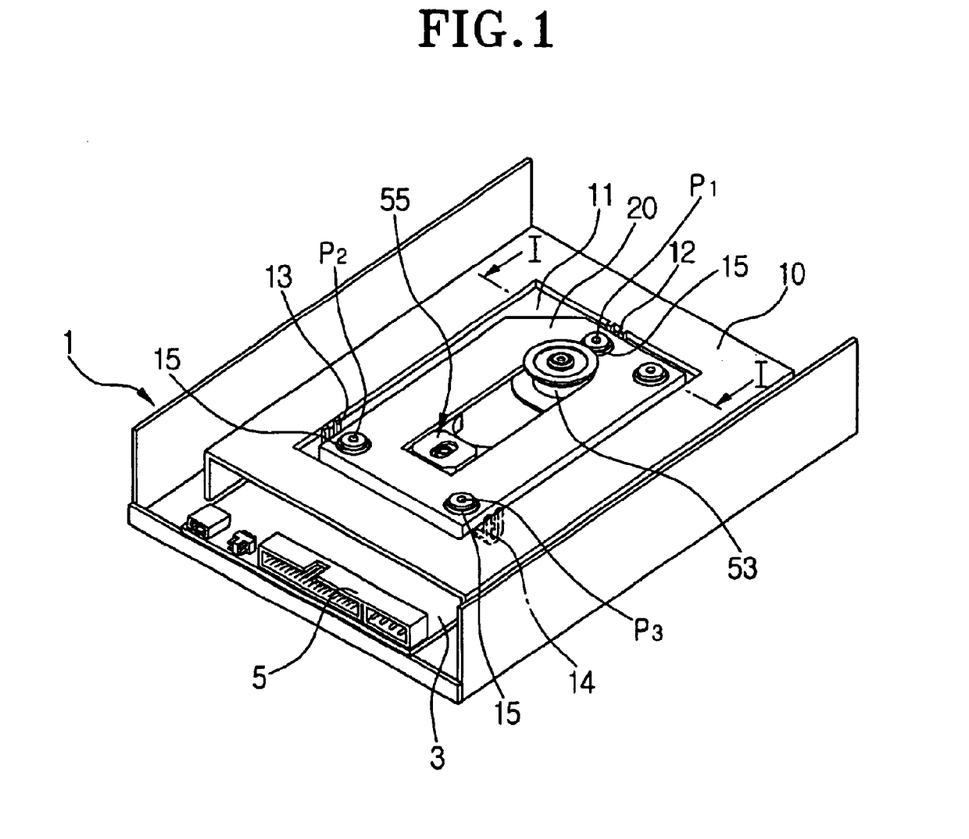
FIG. 1 is a schematic perspective view showing a dynamic vibration absorber for a disk player according to an embodiment of the present invention.

Referring to FIG. 1, a disk player comprises a deck base 10 disposed in a housing 1, a deck plate 20 disposed in the deck base 10, and a dynamic vibration absorber included in the deck plate 20. Various electrical peripheral devices including a circuit board 3 and a connector 5 are also disposed in the housing 1.

The deck base 10 is a chassis structure (i.e., a metal plate fixed in the housing 1) and has an accommodating portion 11 to movably hold and support the deck plate 20. The accommodation portion 11 is a predetermined space formed by partly cutting the deck base 10.

Figure 2:
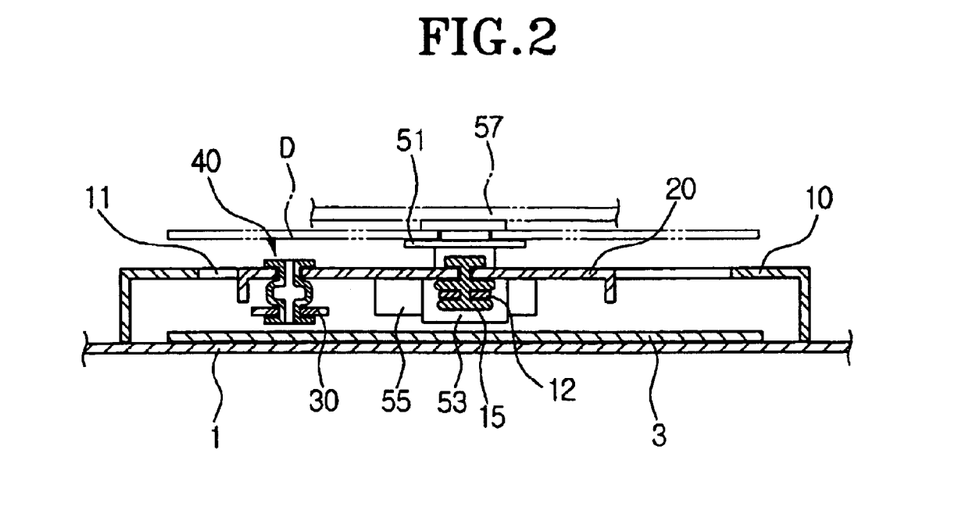
FIG. 2 is a sectional view of the disk player taken along the line I—I of FIG. 1.

As shown in FIG. 2, the dynamic vibration absorber is attached to the deck plate 20 and includes a mass body 30 disposed below the deck plate 20, and a connection member 40 connecting the deck plate 20 and the mass body 30. The deck plate 20 is movably disposed in the accommodation portion 11 of the deck base 10. The deck base 10 has supporting portions 12, 13, 14 disposed corresponding to predetermined supporting points P1, P2, P3 to support the deck plate 20. At these supporting points P1, P2, P3, a damping member 15 is disposed to prevent an outer shock from transferring to the deck plate 20 through the deck base 10. The damping member 15 is generally viscoelastic rubber or a spring, and is inserted between the deck base 10 and the deck plate 20. The deck plate 20 moves relative to the deck base 10 using the flexibility of the damping member 15.

In addition, a spindle motor 53 and an optical pickup 55 are disposed on the deck plate 20. A turntable 51, on which a disk D is settled, is pivotably formed on a rotating shaft of the spindle motor 53. The optical pickup 55 is movable in the radial direction of the disk D while on the turntable 51 using a transferring mechanism, and information is recorded and/or reproduced by projecting light from the optical pickup 55 to and detecting the reflected light from the disk D.

The disk D is inserted into the housing 1 in a disk tray (not shown), and then the disk D is settled on the turntable 51 and is clamped by a damper 57 disposed at the upper part of the housing 1. However, it is understood that there are many ways to load and clamp the disk D on the turntable 51. For example, the disk D can be loaded by elevating the turntable 51 and the spindle motor 53, or by elevating or lowering the disk tray onto the turntable 51.

The deck plate 20 is a metallic or plastic plate, and has a natural resonance frequency. The mass body 30 reduces the resonance generated by the resonance frequency of the deck plate 20 when the disk D spins through a reciprocal action using the connection member 40. It is preferable that the mass body 30 is disposed above or below the deck plate 20, which effectively reduces the vibration in an up and down direction. The up and down direction is a focusing direction of the optical pickup 55 moveably mounted on the deck plate 20. However, it is understood that the connection member 40 can be oriented to reduce the vibration in other directions.

Figure 3:
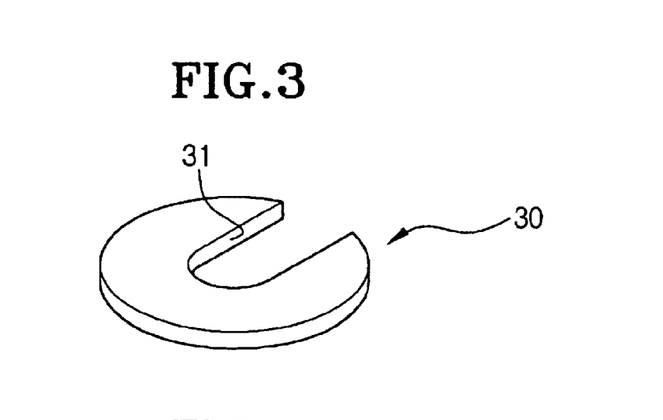
FIG. 3 is a perspective view of the mass body of FIG. 2.

According to an embodiment of the invention shown in FIG. 3, the mass body 30 is a metallic circular plate having a predetermined thickness and mass. Moreover, the mass body 30 has a connection opening 31 cut in a U type from one side. The connection opening 31 allows the mass body 30 to be easily connected with the connection member 40. Therefore, using the connection opening 31, the mass body 30 is connected with the connection member 40 very easily by inserting the connection opening 31 into the connection member 40.

Figure 4:
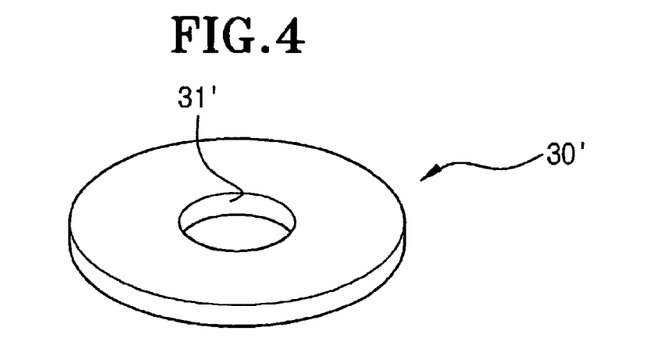
FIG. 4 is a perspective view showing the mass body of FIG. 3 according to another embodiment of the present invention.

According to an embodiment of the invention shown in FIG. 4, instead of the mass body 30 shown in FIG. 3, a ring-type mass body 30' having a connection hole 31' is used. In this case, since the connection hole 31' is connected enclosed within the mass body 30', once the connection member 40 is inserted, easy separation can be prevented.

For mass bodies 30 and 30', the weight and the thickness of the mass body 30 and 30' will be described later in greater detail. However, the weight and thickness are selected with an appropriate value considering the mass (M) of the deck plate 20, the spring constant K of the connection member 40, and the vibration frequency that is problematic in the disk drive.

Figure 5:
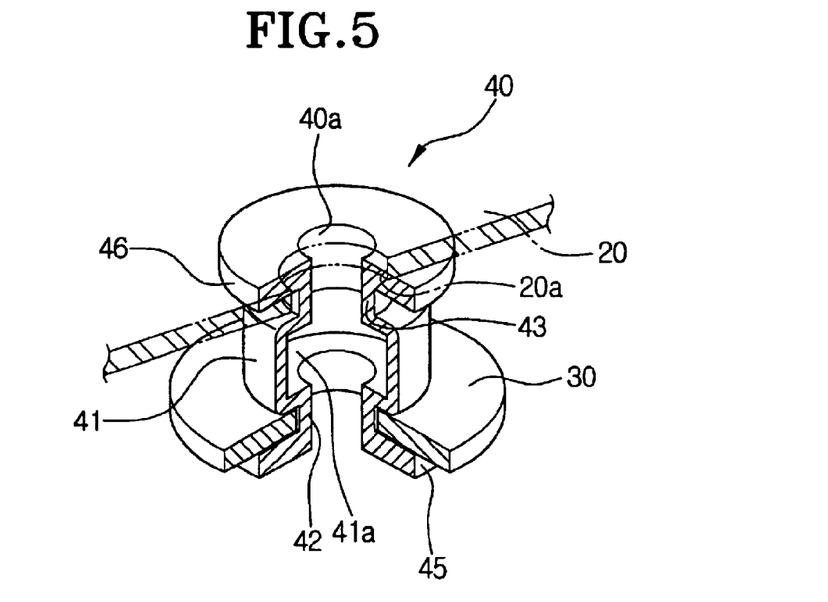
FIG. 5 is a sectional end perspective view showing the connection member of FIG. 2.

As shown in FIG. 5, the connection member 40 is connected to the mass body 30 disposed below the deck plate 20. The connection member 40 has a shape of an hourglass and includes a body 41 having a predetermined space 41a capable of a slackness in accordance with an internal pressure. The connection member 40 also has first and second flange portions 45 and 46 extending from first and second neck portions 42 and 43, which extends symmetrically on both sides of the body 41. The space 41 a within the body 41 is connected to the outside through a hole 40a that extends through the flange portions 45 and 46.

In the above construction, the body 41 is a cylinder type and the action of the internal pressure and slackness can be performed repeatedly as it flexibly changes by an external force. Specifically, the air in the space 41a is discharged externally and drawn internally through the hole 40a, which absorbs the shock and the vibration from the outside. The mass body 30 is inserted into the first neck portion 42 and is supported by the first flange portion 45.

The mass body 30 is prevented from being separated from the first neck portion 42. Thus, it is preferable that the length and the diameter of the first neck portion 42 have a size corresponding to the connection opening 31 of the mass body 30 and the thickness of the mass body 30. Moreover, the connection member 40 is connected to the deck plate 20 using a connection hole 20a formed at the deck plate 20 to receive the second neck portion 43. The second flange portion 46 extends from the second neck portion 43 to restrain the connection member 40 and prevent the connection member 40 from being separated from the connection hole 20a.

It is preferable that the connection member 40 is made from a viscoelastic silicon having a predetermined spring constant K corresponding to the natural vibration frequency of the deck plate 20. However, it is understood that the connection member could also be made from a spring. In addition, it is advisable that the connection member 40 has a sufficient degree of stiffness considering the factors such as elastic deformation and durability.

Figure 6A:
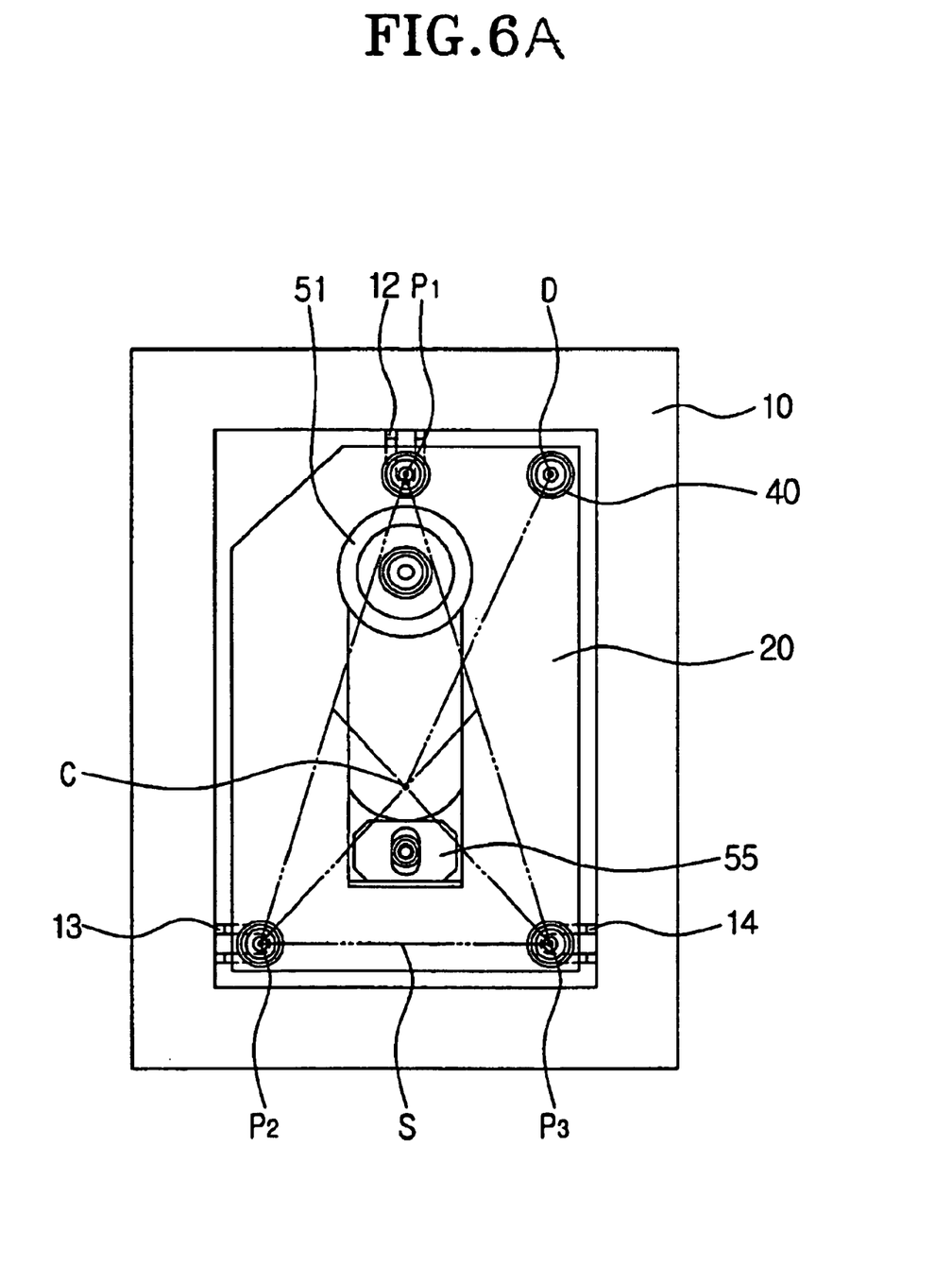
FIG. 6A is a schematic plan view showing the dynamic vibration absorber of FIG. 2.

As shown in FIG. 6A, the mass body 30 and the connection member 40 are disposed at the point of largest amplitude of vibration of the deck plate 20 according to the positions of supporting points P1, P2, P3. Specifically, it is preferable that the mass body 30 and the connection member 40 are disposed at the outermost point D of the deck plate 20, where the outermost point D is the farthest point from a geometrical center C of a predetermined figure S formed by the supporting points P1, P2, P3. In the shown example in FIG. 6A, the predetermined figure S is a triangle. By disposing the mass body 30 and the connection member 40 at the point D, the mass body 30 and the connection member 40 are placed at the farthest point from the center C to reduce vibration and shock at the point D, at which the largest vibration and shock is experienced.

Figure 6B:
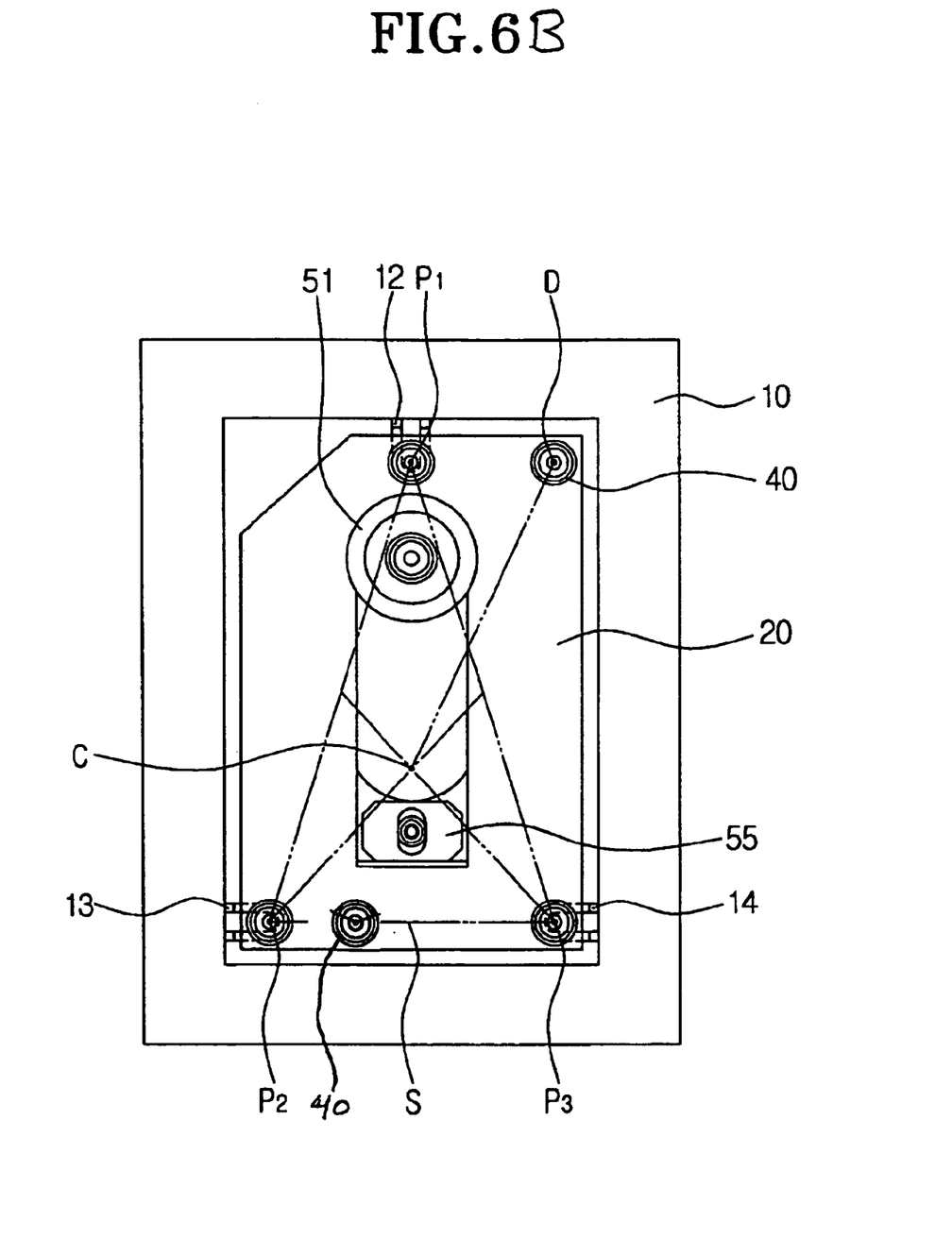
FIG. 6B is a schematic plan view showing a plurality of the dynamic vibration absorbers according to an embodiment of the present invention.

According to another embodiment of the invention shown in FIG. 6B, a plurality of mass bodies 30 and corresponding connection members 40 are disposed around the deck plate 20. In this case, there should be a plurality of connection members 40. The plurality of mass bodies 30 and connection members 40 can be formed at other points beyond the point D. For example, they can be formed at the opposite point of the point D such that the center C is at the center. Further, the plurality of mass bodies 30 and connection members 40 can be disposed at the points in descending order of distance from from the center C.

In addition, while the mass body 30 is shown as disposed below the deck plate 20, it is understood that the mass body 30 can be disposed above the deck plate 20. Further, the mass body 30 can be disposed at the point of the largest vibration shift from the geometrical center C. Since the point of the largest vibration shift of the deck plate 20 may not be the farthest point from the center C, it can be found by separately measuring the vibration shift of the deck plate 20. It is further understood that the mass body 30 and the connection member 40 can be formed as a combined member through techniques such as injection molding.

The operation of a dynamic vibration absorber for a disk player of an embodiment of the present invention will be described in detail using FIGS. 7–10.

Figure 7:
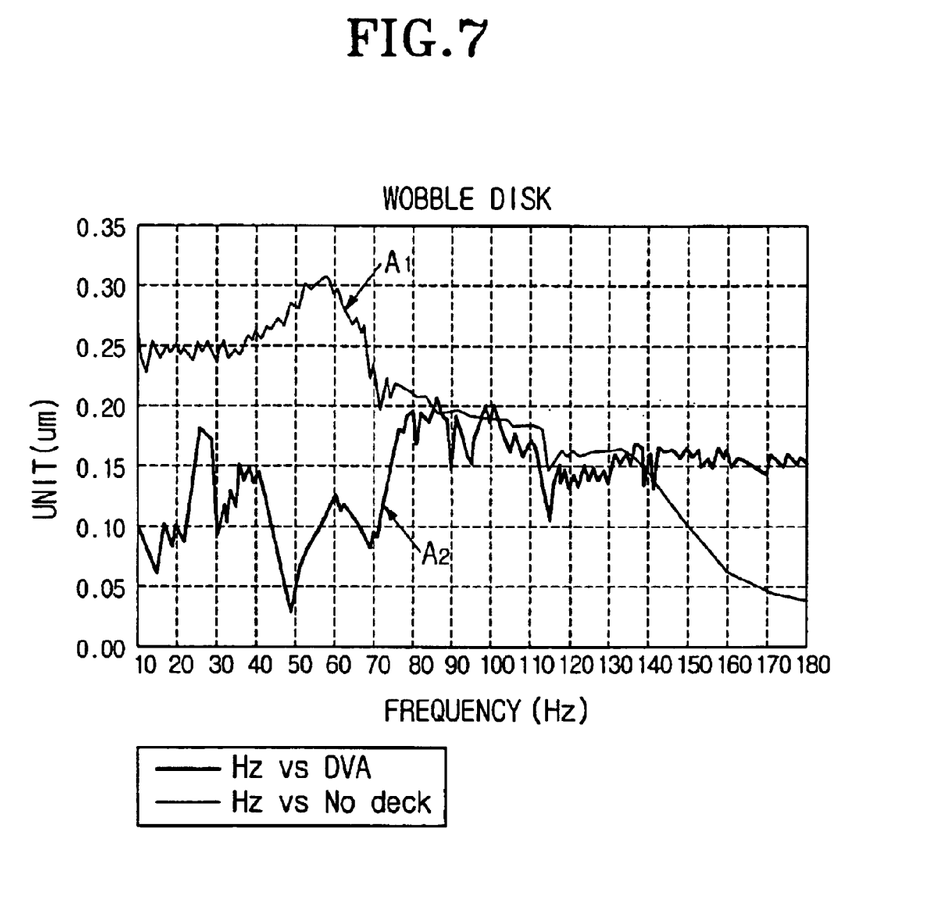
FIGS. 7 and 8 are graphs comparing the vibration frequency volume of a disk player using the dynamic vibration absorber using an embodiment of the present invention and that of a conventional disk player.
Figure 8:
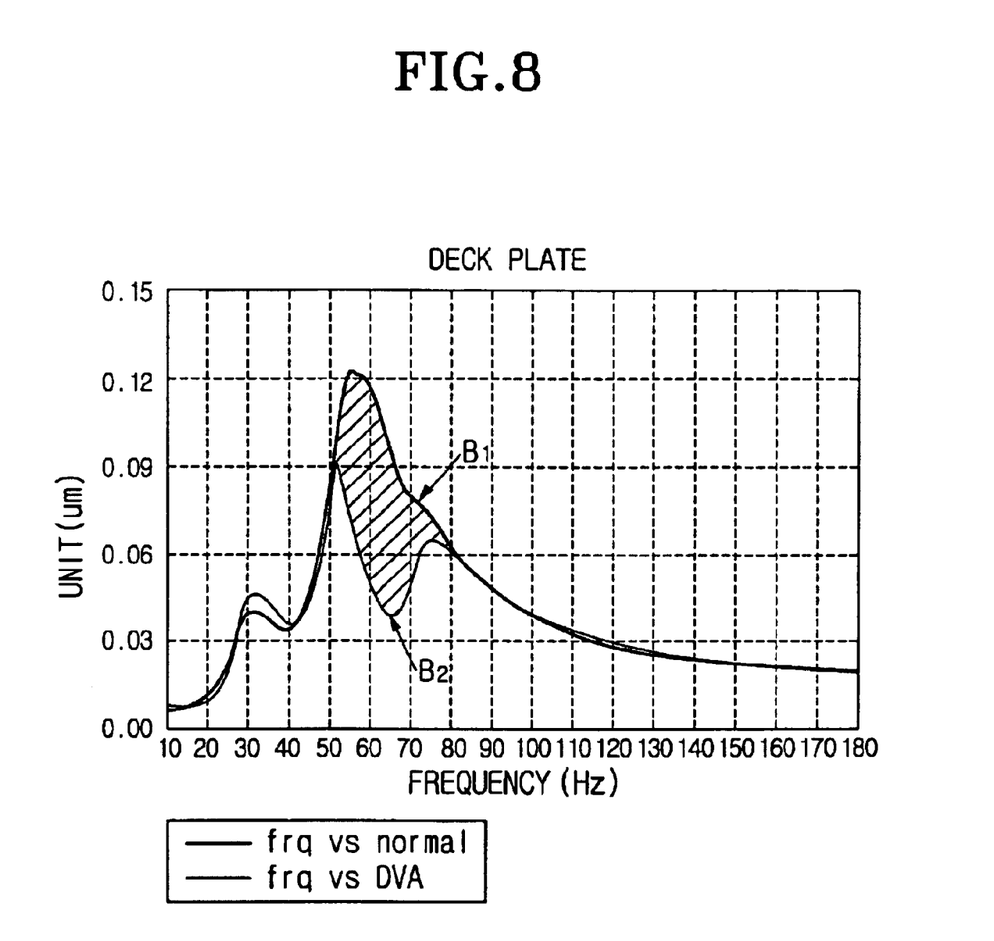

FIGS. 7 and 8 show the vibration feature of disk players with and without the dynamic vibration absorber of the present invention. FIG. 7 is a graph measuring the frequency of a deformed wobble disk which has an RPM that increases from 0 to 10000 using the spindle motor 53 excluding the deck plate 20. As shown in FIG. 7, comparison example A1 lacks the dynamic vibration absorber and generates resonance around 60 Hz with no influence of the deck plate 20 and the optical pickup 55. On the other hand, in experimental example A2, which has the dynamic vibration absorber, the resonance has been largely reduced around 60 Hz. In other words, by a repeated reciprocal action of the connection member 40 and the mass body 30, the vibration at roughly the resonance frequency of the disk D has been effectively reduced.

FIG. 8 is a graph measuring the vibration volume of the deck plate 20 under the same condition as the deck plate 20 in the FIG. 7. As shown in FIG. 8, comparison example B1, which lacks the dynamic vibration absorber, has a vibration volume that increases at around 60 Hz. The vibration volume of the deck plate 20 has a great influence on the operation of the optical pickup 55 due to its amplifying the vibration of the disk D. For experimental example B3, which has the dynamic vibration absorber, the vibration volume for the resonance frequency of the deck plate 20 has been effectively reduced. The reduced volume of the vibration energy, which reveals the volume of the vibration energy absorbed by the reciprocal action of the connection member 40 and the mass body 30, is the region designated by cross-hatching in FIG. 8. Thus, when the dynamic vibration absorber is used, not only is the strong vibration by resonance of the deck plate 20 eliminated, but the structural bone noise caused by the vibration can also be eliminated.

Through the above experiment, even though the spinning speed of the disk D is increased, if the disk applies the dynamic vibration absorber having a resonance frequency corresponding to the problematic vibration frequency, then the generation or amplifying of vibration of the deck plate 20 can be effectively prevented.

Figure 9:
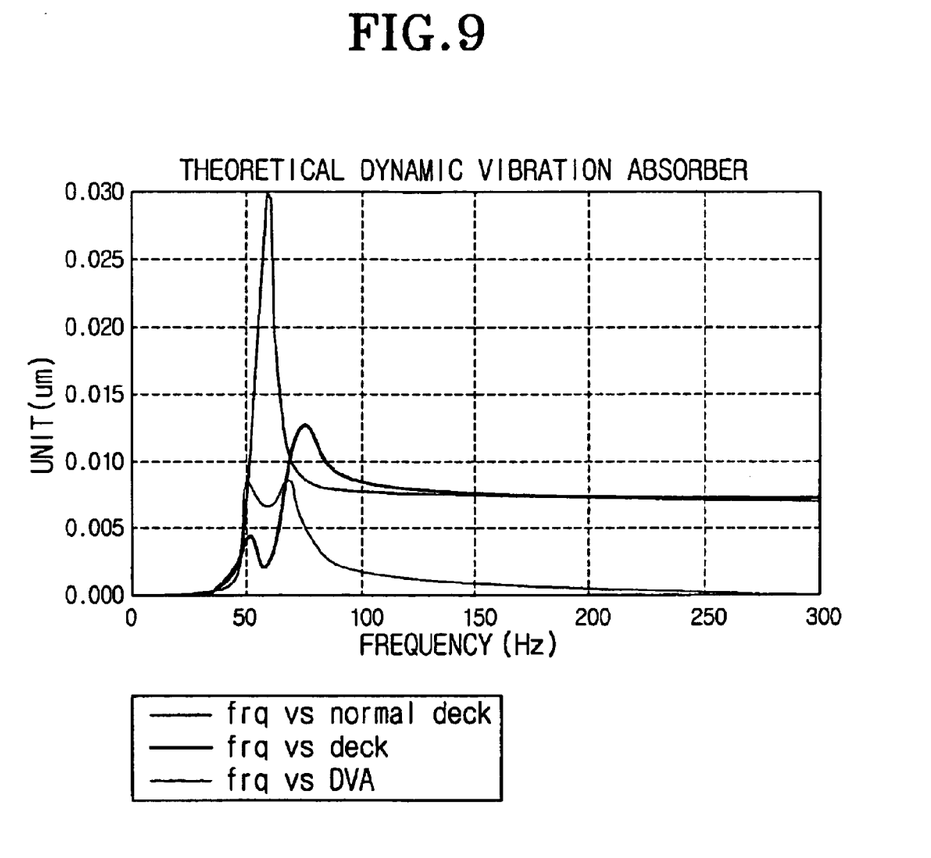
FIG. 9 is a graph showing a theoretical vibration absorbing effect of a dynamic vibration absorber according to an embodiment of the present invention.

On the other hand, to design the dynamic vibration absorber corresponding to the deck plate 20, the resonance frequency due to the reciprocal action of the connection member 40 and the mass body 30 is found by measuring the mass of the mass body 30 and determining the spring constant K of the connection member 40. These values are determined using a computer simulation through a well known FEM (Finite Element Method). For example, for the dynamic vibration absorber to have the natural vibration frequency of about 60 Hz, the spring constant K of the connection member 40 is about 466 (kg/sec$^2$), and the mass of the mass body 30 is about 3.28 g, according to the FEM (Finite Element Method). In this case, the mass body 30 can be manufactured as a circular plate having a thickness of 2 mm and a diameter of 18 mm. The vibration reducing effect using the theoretical dynamic vibration absorber obtained using this result can be easily checked through an experimental value by a simulation as shown in FIG. 9. In other words, using computer simulations, a theoretical dynamic vibration absorber can be designed to effectively absorb the vibration of the deck plate 20 having a resonance frequency at around 60 Hz.

Figure 10:
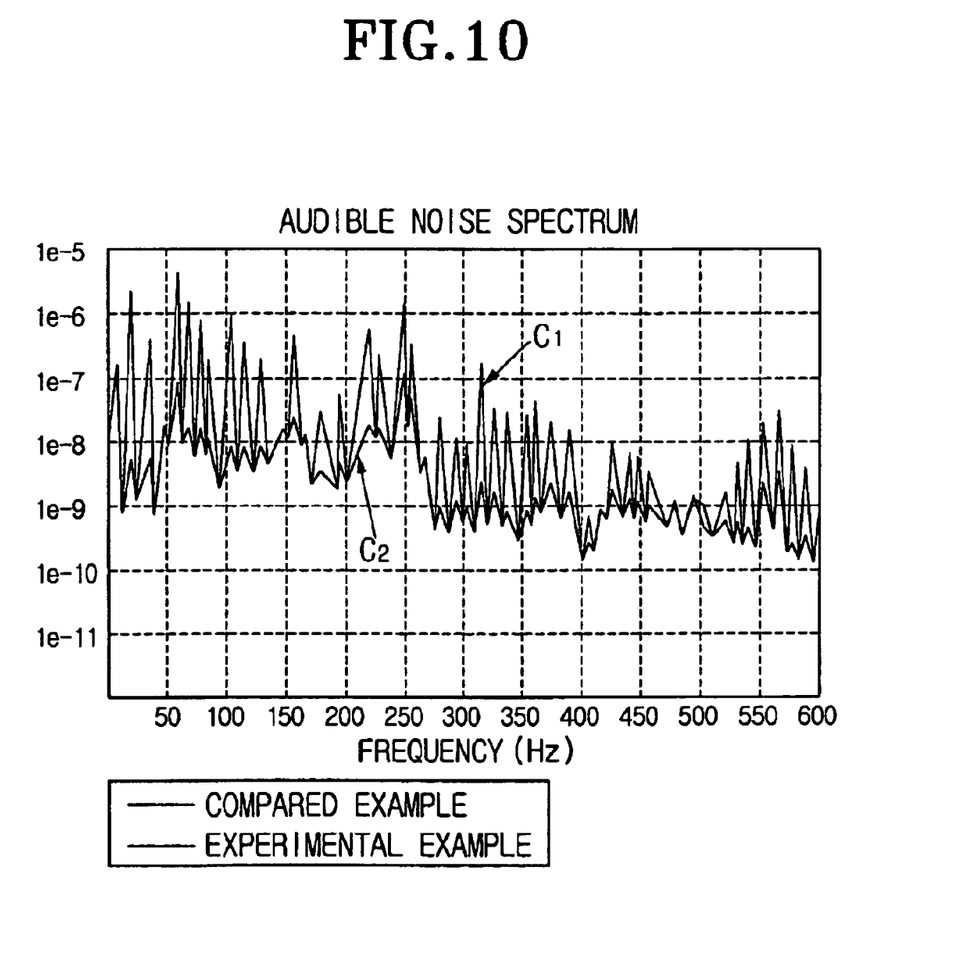
FIG. 10 is a graph comparing the noise resulting from an experiment using an embodiment of the present invention and the noise resulting from a conventional disk player.

Moreover, as shown in TABLE 1 and FIG. 10, comparison example C1, which lacks the dynamic vibration absorber, generates structural noise due to the vibration by resonance at 16× speed (62 Hz, about 3600 RPM). This results in the noise shown in FIG. 10. As such, it can be inferred that the natural vibration frequency of the wobble disk and harmonic natural vibration frequency over 3× speed are the same, which cause the structural noise to be generated. In this case, noise of about 41~42 dBA was detected.

TABLE 1

| Spinning Speed | Comparison Example (C1) (dBA) | Experimental Example (C2) (dBA) | Remarks |
| --- | --- | --- | --- |
| 16 | 41.5 | 36.0 | 5.5 dBA reducing effect |

Meanwhile, in experimental example C2, which uses the dynamic vibration absorber, the dynamic vibration absorber is shown to have absorbed most of the vibration due to the resonance. Thus, the vibration volume of the deck plate 20 and the disk D is considerably reduced, and the structural noise is substantially reduced. In this case, noise of about 35~36 dBA, which is less than the comparison example C1, was detected. The detected value is about 5.5 dBA lower than the noise detected from comparison example C1. As such, the dynamic vibration absorber has a large effect on reducing the structural noise.

Therefore, if the resonance frequency is changed in accordance with a variation in the model of the deck plate 20, by designing the resonance frequency by the reciprocal action of the connection member 40 and the mass body 30 with the FEM (Finite Element Method) to correspond to the resonance frequency of the different deck plate 20, the appropriate dynamic vibration absorber can be manufactured and applied.

Figure 11:
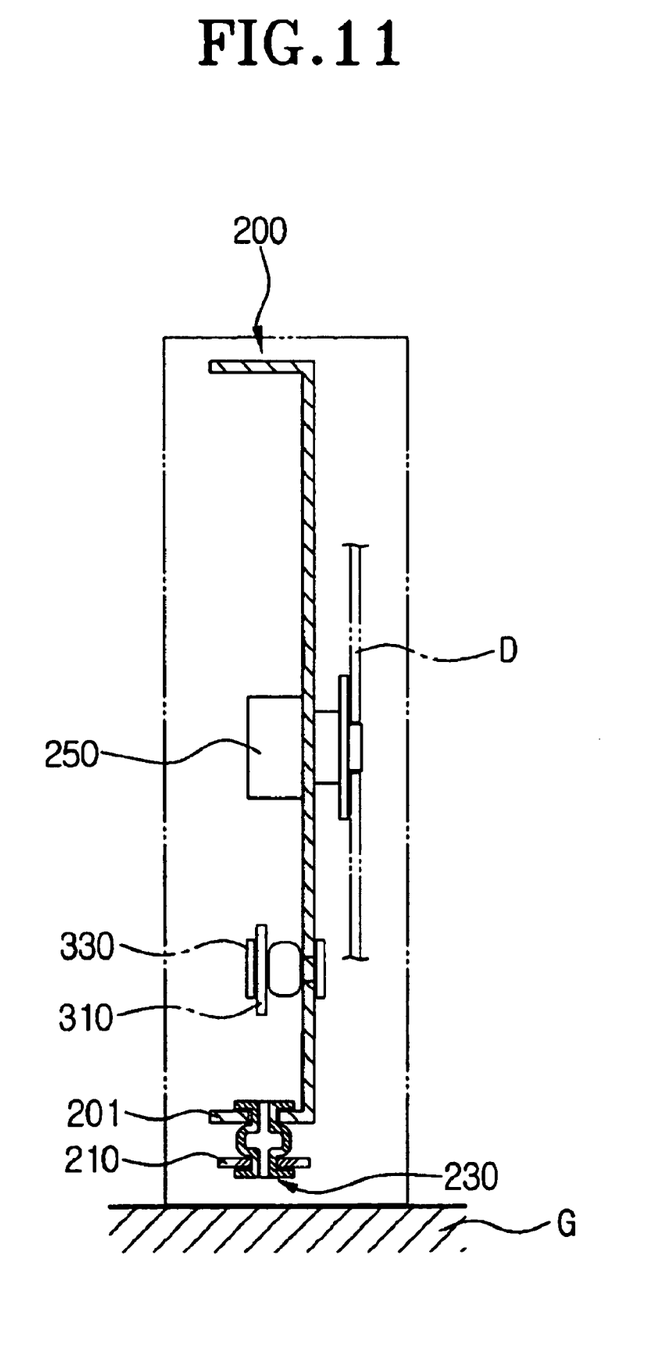
FIG. 11 is a sectional view showing a dynamic vibration absorber for a disk player of another embodiment of the present invention.

According to another embodiment of the present invention shown in FIG. 11, the disk D is in a vertical-type disk player that accommodates the disk D while standing on a supporting side G. A deck plate 200 is accommodated vertically, and includes a mass body 210 and a connection member 230. The mass body 210 is disposed below a lower side 201 of the deck plate 200. The connection member 230 connects the mass body 210 to the side 201. In view of the above description, a detailed description of the mass body 210 and the connection member 230 will be omitted. When a spindle motor 250, which is disposed at the deck plate 200, spins, the increased vibration for the increase of the natural frequency of the deck plate 200 and the natural frequency of the disk D can be effectively reduced in the same way as described above. In addition, another mass body 310 and another connection member 330 are capable of moving in a right and left direction of the deck plate 200.

As described above, the dynamic vibration absorber of the present invention is designed with a simple structure and used such that, when the disk spins, the vibration by the resonance frequency of the deck plate can be effectively reduced. Further, by disposing the mass body at a predetermined point corresponding to the largest vibration amplitude of the deck plate, the vibration-absorbing effect of the dynamic vibration absorber can be maximized. Therefore, by stabilizing the dynamic feature of the deck plate and the disk, the operation of the optical pickup can be smoothly performed, and servo control can be easily done. In addition, ampere wastage is reduced by reducing the load of the spindle motor, which also extends the life span of the machine. Moreover, the user can use the product with a pleasant atmosphere of low noise and vibration, further upgrading the refinement of the product.

Meanwhile, while the dynamic vibration absorber of the present invention can be realized as various embodiments having various forms and structures as has been shown and described, it would be appreciated by those skilled in the art that changes may be made in this embodiment without departing from the principles and spirit of the invention, the scope of which is defined in the claims and their equivalents.

What is claimed is:

1. A dynamic vibration absorber for a disk player that records and/or reproduces data to and from a disk, comprising:

a deck base;

a deck plate movably supported by said deck base to support a spindle motor that spins the disk;

a mass body having substantially a ring shape and which is disposed around said deck plate;

a flexibly changeable connection member having a first end that connects with and extends through said deck plate and a second end that connects with said mass body so as to allow a reciprocal action between said mass body and said deck plate; and supporting members to support said deck plate at predetermined support points which define a figure, wherein:

the reciprocal action of said mass body and said connection member reduces a vibration generated when the disk spins, and said mass body is placed at an outermost point from a geometrical center of the figure defined by the supporting points.

2. The dynamic vibration absorber for a disk player of claim 1, further comprising a supporting member to support said deck plate at a supporting point, and a viscoelastic member disposed at the supporting point of said deck plate to reduce an effect of an outer shock transmitted between said deck plate and said deck base.

3. The dynamic vibration absorber for a disk player of claim 1, wherein said mass body is disposed above or below said deck plate to reduce a vibration in an upper and a lower direction relative to said deck plate.

4. The dynamic vibration absorber for a disk player of claim 1, further comprising additional mass bodies and corresponding connection members attached to said deck plate.

5. A dynamic vibration absorber for a disk player that records and/or reproduces data to and from a disk, comprising:

a deck base;

a deck plate movably supported by said deck base to support a spindle motor that spins the disk;

a mass body having substantially a ring shape and which is disposed around said deck plate;

a flexibly changeable connection member having a first end that connects with and extends through said deck plate and a second end that connects with said mass body so as to allow a reciprocal action between said mass body and said deck plate; and supporting members to support said deck plate at predetermined support points which define a figure, wherein:

the reciprocal action of said mass body and said connection member reduces a vibration generated when the disk spins, and said mass body is disposed at a predetermined place on said deck plate that has a largest vibration shift from a geometrical center of the figure defined by the supporting points.

6. The dynamic vibration absorber for a disk player of claim 5, wherein said mass body is disposed above or below said deck plate to reduce a vibration in an upper and a lower direction relative to said deck plate.

7. The dynamic vibration absorber for a disk player of claim 5, further comprising a supporting member to support said deck plate at a supporting point, and a viscoelastic member disposed at the supporting point of said deck plate to reduce an effect of an outer shock transmitted between said deck plate and said deck base.

8. A dynamic vibration absorber for a disk player that records and/or reproduces data to and from a disk, comprising:
- a deck base;
- a deck plate movably supported by said deck base to support a spindle motor that spins the disk;
- a mass body disposed around said deck plate; and
- a flexibly changeable connection member that connects said deck plate and said mass body so as to allow a reciprocal action between said mass body and said deck plate, wherein:
the reciprocal action of said mass body and said connection member reduces a vibration generated when the disk spins,
said connection member comprises:
- a body that is flexibly changeable by an external force and has an internal space to allow compression;
- a first flange portion extending from the body to support said mass body; and
- a second flange portion extending from the body to fit into said deck plate to be supported by said deck plate, and said connection member is not connected to said deck base.

9. The dynamic vibration absorber for a disk player of claim 8, wherein said deck plate has a connection hole through which the second flange portion extends to be supported by said deck plate.

10. The dynamic vibration absorber for a disk player of claim 8, wherein said mass body comprises a metallic plate having a connection opening cut from one end to allow insertion above the first flange.

11. A dynamic vibration absorber for a disk player that records and/or reproduces data to and from a disk, comprising:
- a deck base;
- a deck plate movably supported by said deck base to support a spindle motor that spins the disk;
- a mass body disposed around said deck plate; and
- a flexibly changeable connection member that connects said deck plate and said mass body so as to allow a reciprocal action between said mass body and said deck plate, wherein:
the reciprocal action of said mass body and said connection member reduces a vibration generated when the disk spins, and
said connection member comprises:
- a body that is flexibly changeable by an external force and has an internal space to allow compression;
- a first flange portion extending from the body to support said mass body; and
- a second flange portion extending from the body to fit into said deck plate to be supported by said deck plate, and said mass body comprises a metallic ring having a connection hole having a size that is smaller than a size of the fist flange portion so as to be supported by the first flange portion.

12. A dynamic vibration absorber for a disk player that records and/or reproduces data to and from a disk, comprising:
- a deck base;
- a deck plate movably supported by said deck base to support a spindle motor that spins the disk;
- a mass body having a ring shape and which is disposed around said deck plate;
- a flexibly changeable connection member that connects said deck plate and said mass body so as to allow a reciprocal action between said mass body and said deck plate; and
- supporting members to support said deck plate at predetermined support points which define a figure, wherein:
the reciprocal action of said mass body and said connection member reduces a vibration generated when the disk spins,
said mass body is placed at an outermost point from a geometrical center of the figure defined by the supporting points, and
said mass body is disposed on a side of said deck plate to reduce a vibration in a direction perpendicular to the side of said deck plate.

13. A dynamic vibration absorber for a disk player that records and/or reproduces data to and from a disk, comprising:
- a deck base;
- a deck plate movably supported by said deck base to support a spindle motor that spins the disk;
- a mass body disposed around said deck plate;
- a flexibly changeable connection member that connects said deck plate and said mass body so as to allow a reciprocal action between said mass body and said deck plate; and
- supporting members to support said deck plate at predetermined support points which define a figure, wherein:
the reciprocal action of said mass body and said connection member reduces a vibration generated when the disk spins,
said mass body comprises a ring having a connection hole having a size that is smaller than a size of an element of said connection member such that said connection member supports said mass body,
said mass body is disposed at a predetermined place on said deck plate that has a largest vibration shift from a geometrical center of the figure defined by the supporting points, and
said mass body is disposed on a side of said deck plate to reduce vibration in a direction perpendicular to the side of said deck plate.

14. A dynamic vibration absorber for a disk player that records and/or reproduces data to and from a disk, comprising:
- a deck base;
- a deck plate movably supported by said deck base to support a spindle motor that spins the disk;

a mass body having substantially a ring shape and which is disposed around said deck plate;

a flexibly changeable connection member having a first end that connects with and extends through said deck plate and a second end that connects with said mass body so as to allow a reciprocal action between said mass body and said deck plate;

a supporting member to support said deck plate at a supporting point; and a viscoelastic member disposed at the supporting point of said deck plate to reduce an effect of an outer shock transmitted between said deck plate and said deck base, wherein the reciprocal action of said mass body and said connection member reduces a vibration generated when the disk spins.

15. A dynamic vibration absorber for a disk player that records and/or reproduces data to and from a disk, comprising:

a deck base;

a deck plate movably supported by said deck base to support a spindle motor that spins the disk;

a mass body disposed around said deck plate; and a flexibly changeable connection member that connects said deck plate and said mass body so as to allow a reciprocal action between said mass body and said deck plate, wherein:

the reciprocal action of said mass body and said connection member reduces a vibration generated when the disk spins, and said mass body and said connection member comprise a combined member combined using an injection molding process.

16. The dynamic vibration absorber of claim 15 wherein the mass body has a substantially rounded side and is disposed on a side of said deck plate to reduce a vibration in a direction perpendicular to the side of said deck plate.

17. A dynamic vibration absorber of claim 15, wherein:

said connection member comprises:

a body that is flexibly changeable by an external force and has an internal space to allow compression;

a first flange portion extending from the body to support said mass body; and a second flange portion extending from the body to fit into said deck plate to be supported by said deck plate, and said mass body comprises a ring having a size that is smaller than a size of the first flange portion so as to be supported by the first flange portion.

18. A dynamic absorber for use in a disk player that records and/or reproduces data to and from a disk, which includes a movable plate that supports a spindle motor used to spin the disk, the absorber comprising:

a flexible connection member adapted to be connected to the movable plate; and a mass body connected to said connection member and to be connected to the movable plate only by said connection member, wherein:

said connection member and said mass body move relative to the movable plate so as to absorb a vibration generated when the disk spins, said connection member comprises a body, and flanges extending outward from the body to support said mass body apart from the movable plate, and said mass comprises a plate having a notch cut into a side of the plate and through which the mass is connected to the body.

19. The dynamic absorber of claim 18, wherein said connection member and said mass body move in non-parallel direction to an axis of rotation of the disk to absorb a vibration along the axis of rotation of the disk.

20. The dynamic absorber of claim 19, wherein said connection member and said mass body move in a direction perpendicular to the axis of rotation of the disk.

21. The dynamic absorber of claim 18, wherein said connection member and said mass body move in a direction parallel to an axis of rotation of the disk to absorb a vibration moving along the axis of rotation of the disk.

22. The dynamic absorber of claim 18, wherein the body comprises neck portions connecting the body and the flanges, said mass body is connected to said connection member at one of the neck portions, and said connection member is adapted to be connected to a hole in the movable plate at another one of the neck portions.

23. The dynamic absorber of claim 22, wherein the connection member does not support the movable plate relative to another surface of the disk player.

24. The dynamic absorber of claim 18, wherein the body defines an opening therein, and the flanges include holes connecting the opening to an area external to the dynamic absorber.

25. A dynamic absorber for use in a disk player that records and/or reproduces data to and from a disk, which includes a movable plate that supports a spindle motor used to spin the disk, the absorber comprising:

a flexible connection member adapted to be connected to the movable plate at a first end and having an internal space extending through the member from an opening in the first end to an opposing end; and a mass body connected to said connection member, wherein:

said connection member and said mass body move relative to the movable plate so as to absorb a vibration generated when the disk spins, the dynamic absorber has roughly a same natural resonance frequency as the movable plate, and the connection member does not support the movable plate relative to another surface of the disk player.

26. The dynamic absorber of claim 25, wherein:

said mass body has a notch in a side into which said connection member is received and a mass, and said connection member has a spring constant such that the dynamic absorber has roughly the same natural resonance frequency as the movable plate.

27. The dynamic absorber of claim 25, wherein said mass body comprises a plate comprising a hole therein, and the hole surrounds the body of said connection member.

28. The dynamic absorber of claim 25, wherein said mass body comprises a plate comprising a slot extending from an edge of the said mass body towards a center of said mass body, and the slot surrounds portions of the body of said connection member while being shaped to receive the body when said mass body is inserted onto said connection member.

29. A recording and/or reproducing apparatus to record and/or reproduce data to and from a disk, comprising:
- a housing;
- a deck plate movably supported within said housing, said deck plate having a predetermined frequency;
- an optical head movably supported within said housing to record and/or reproduce the data to and from the disk;
- a spindle motor supported by said deck plate and which spins the disk; and
- a dynamic absorber having a frequency that roughly corresponds to the predetermined frequency of said deck plate so as to absorb a vibration generated when the disk spins, the dynamic absorber comprising an elastic member extending through the deck plate and supporting a substantially ring-shaped mass body apart from the deck plate.

30. The recording and/or reproducing apparatus of claim 29, wherein the predetermined frequency of said deck plate comprises a natural frequency of said deck plate.

31. The recording and/or reproducing apparatus of claim 30, wherein said dynamic absorber is attached to said deck plate at a point where said deck plate experiences a maximum vibration amplitude.

32. The recording and/or reproducing apparatus of claim 30, further comprising supporting members to movably support said deck plate within said housing,
- wherein said dynamic absorber is attached to said deck plate at a point where said deck plate experiences a maximum vibration shift from a geometric center of a shape defined by attachment points at which said supporting members are connected to said deck plate.

33. The recording and/or reproducing apparatus of claim 30, further comprising supporting members to movably support said deck plate within said housing,
- wherein said dynamic absorber is attached to said deck plate at a point farthest from a geometric center of a shape defined by attachment points at which said supporting members are connected to said deck plate.

34. The recording and/or reproducing apparatus of claim 29, wherein
- said dynamic absorber further comprises
  - flexible connection members connected to said deck plate at corresponding attachment points, and
  - mass bodies connected to corresponding ones of the connection member; and
- the connection members and the mass bodies move relative to said deck plate so as to absorb the vibration generated when the disk spins.

35. The recording and/or reproducing apparatus of claim 29, wherein said dynamic absorber absorbs the most vibration volume at roughly a natural frequency of said deck plate.

36. The recording and/or reproducing apparatus of claim 29, wherein:
- the elastic member comprises:
  - a flexible connection member which is connected to said deck plate, and
  - the mass body is connected to the connection member; and
- the connection member and the mass body move relative to said deck plate so as to absorb the vibration generated when the disk spins.

37. A recording and/or reproducing apparatus to record and/or reproduce data to and from a disk, comprising:
- a housing;
- a deck plate movably supported within said housing, said deck plate having a predetermined frequency;
- an optical head movably supported within said housing to record and/or reproduce the data to and from the disk;
- a spindle motor supported by said deck plate and which spins the disk; and
- a dynamic absorber having a frequency that roughly corresponds to the predetermined frequency of said deck plate so as to absorb a vibration generated when the disk spins,
- wherein:
  - said dynamic absorber comprises:
    - a flexible connection member connected to said deck plate, and
    - a mass body connected to the connection member,
    - the connection member and the mass body move relative to said deck plate so as to absorb the vibration generated when the disk spins,
    - the mass body comprises a substantially ring-shaped side and having a mass, and
    - the connection member has a spring constant such that said dynamic absorber has roughly the same natural resonance frequency as said deck plate.

38. A recording and/or reproducing apparatus to record and/or reproduce data to and from a disk, comprising:
- a housing;
- a deck plate movably supported within said housing, said deck plate having a predetermined frequency;
- an optical head movably supported within said housing to record and/or reproduce the data to and from the disk;
- a spindle motor supported by said deck plate and which spins the disk; and
- a dynamic absorber having a frequency that roughly corresponds to the predetermined frequency of said deck plate so as to absorb a vibration generated when the disk spins,
- wherein:
  - said dynamic absorber comprises:
    - a flexible connection member connected to said deck plate, and
    - a mass body connected to the connection member,
    - the connection member and the mass body move relative to said deck plate so as to absorb the vibration generated when the disk spins,
    - the connection member comprises
      - a body, and
      - flanges extending outward from the body to support said mass body apart from said deck plate, and
    - the connection member does not support said deck plate relative to said housing and has an opening extending from a first end which is connected to said deck plate to another end.

* * * * *

UNITED STATES PATENT AND TRADEMARK OFFICE
CERTIFICATE OF CORRECTION

PATENT NO.   : 6,859,933 B2  
DATED        : February 22, 2005  
INVENTOR(S)  : Jun-min Park et al.

Page 1 of 1

It is certified that error appears in the above-identified patent and that said Letters Patent is hereby corrected as shown below:

Column 12,
Line 8, after "in" insert -- a --.

Signed and Sealed this

Sixth Day of December, 2005

JON W. DUDAS
*Director of the United States Patent and Trademark Office*